United States Patent
Raikin et al.

(10) Patent No.: US 9,925,492 B2
(45) Date of Patent: Mar. 27, 2018

(54) REMOTE TRANSACTIONAL MEMORY

(71) Applicant: Mellanox Technologies Ltd., Yokneam (IL)

(72) Inventors: Shlomo Raikin, Moshav Ofer (IL); Liran Liss, Atzmon (IL); Ariel Shachar, Jerusalem (IL); Noam Bloch, Bat Shlomo (IL); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 442 days.

(21) Appl. No.: 14/665,043

(22) Filed: Mar. 23, 2015

(65) Prior Publication Data

US 2015/0269116 A1    Sep. 24, 2015

Related U.S. Application Data

(60) Provisional application No. 61/969,350, filed on Mar. 24, 2014.

(51) Int. Cl.

| | |
|---|---|
| *G06F 15/16* | (2006.01) |
| *B01D 53/94* | (2006.01) |
| *G06F 9/46* | (2006.01) |
| *G06F 13/28* | (2006.01) |
| *G06F 15/173* | (2006.01) |
| *B01J 37/02* | (2006.01) |

(Continued)

(52) U.S. Cl.
CPC ........ *B01D 53/9418* (2013.01); *B01J 29/072* (2013.01); *B01J 29/76* (2013.01); *B01J 29/763* (2013.01); *B01J 35/04* (2013.01); *B01J 37/0246* (2013.01); *G06F 9/467* (2013.01); *G06F 13/287* (2013.01); *G06F 15/17331* (2013.01); *B01D 53/9477* (2013.01); *B01D 2251/2062* (2013.01); *B01D 2255/20761* (2013.01); *B01D 2255/50* (2013.01); *B01J 35/0006* (2013.01); *B01J 2229/186* (2013.01); *Y02C 20/10* (2013.01)

(58) Field of Classification Search
USPC ........................................... 709/212
See application file for complete search history.

(56) References Cited

U.S. PATENT DOCUMENTS

| | | | |
|---|---|---|---|
| 5,434,975 A * | 7/1995 | Allen | G06F 9/544 709/215 |
| 5,913,213 A | 6/1999 | Wikstrom et al. | |

(Continued)

OTHER PUBLICATIONS

Hammond et al., "Transactional Memory Coherence and Consistency", Proceedings of the 31st annual international symposium on Computer architecture, vol. 32, issue 2, 12 pages, Mar. 2004.

(Continued)

*Primary Examiner* — Imad Hussain
(74) *Attorney, Agent, or Firm* — D. Kligler IP Services Ltd.

(57) ABSTRACT

Remote transactions using transactional memory are carried out over a data network between an initiator host and a remote target. The transaction comprises a plurality of input-output (IO) operations between an initiator network interface controller and a target network interface controller. The IO operations are controlled by the initiator network interface controller and the target network interface controller to cause the first process to perform accesses to the memory location atomically.

23 Claims, 8 Drawing Sheets

(51) Int. Cl.
B01J 29/072 (2006.01)
B01J 29/76 (2006.01)
B01J 35/04 (2006.01)
B01J 35/00 (2006.01)

(56) References Cited

U.S. PATENT DOCUMENTS

| | | | |
|---|---|---|---|
| 5,948,062 A | 9/1999 | Tzelnic et al. | |
| 5,987,552 A * | 11/1999 | Chittor | G06F 13/387 710/310 |
| 6,038,651 A * | 3/2000 | VanHuben | G06F 9/505 712/17 |
| 6,044,438 A * | 3/2000 | Olnowich | G06F 12/0813 707/999.201 |
| 6,092,155 A * | 7/2000 | Olnowich | G06F 12/0817 709/200 |
| 6,108,764 A * | 8/2000 | Baumgartner | G06F 12/0813 710/104 |
| 6,154,816 A * | 11/2000 | Steely | G06F 9/52 711/121 |
| 6,275,907 B1 * | 8/2001 | Baumgartner | G06F 12/0828 711/119 |
| 6,338,122 B1 * | 1/2002 | Baumgartner | G06F 12/0815 711/100 |
| 6,490,662 B1 | 12/2002 | Pong et al. | |
| 6,523,066 B1 | 2/2003 | Montroy et al. | |
| 7,376,800 B1 * | 5/2008 | Choquette | G06F 9/528 711/130 |
| 7,640,545 B2 * | 12/2009 | Kumar | G06Q 20/108 705/70 |
| 8,213,315 B2 | 7/2012 | Crupnicoff et al. | |
| 8,761,189 B2 | 6/2014 | Scachar et al. | |
| 9,164,702 B1 * | 10/2015 | Nesbit | G06F 3/067 |
| 2003/0084038 A1 | 5/2003 | Balogh et al. | |
| 2004/0193734 A1 | 9/2004 | Barron et al. | |
| 2005/0144339 A1 | 6/2005 | Wagh et al. | |
| 2007/0079075 A1 * | 4/2007 | Collier | G06F 12/082 711/141 |
| 2009/0113443 A1 * | 4/2009 | Heller, Jr. | G06F 9/3004 718/106 |
| 2010/0017572 A1 | 1/2010 | Koka et al. | |
| 2010/0010694 A1 | 4/2010 | Bellows et al. | |
| 2010/0191711 A1 | 7/2010 | Carey et al. | |
| 2011/0099335 A1 * | 4/2011 | Scott | G06F 12/0842 711/141 |
| 2012/0023295 A1 | 1/2012 | Nemawarkar | |
| 2012/0179877 A1 * | 7/2012 | Shriraman | G06F 9/524 711/141 |
| 2012/0310987 A1 * | 12/2012 | Dragojevic | G06F 9/467 707/792 |
| 2013/0019000 A1 | 1/2013 | Markus et al. | |
| 2013/0290473 A1 * | 10/2013 | Chen | G06F 9/544 709/216 |
| 2014/0025884 A1 | 1/2014 | Stark et al. | |
| 2014/0040551 A1 * | 2/2014 | Blainey | G06F 12/0833 711/122 |
| 2014/0040557 A1 * | 2/2014 | Frey | G06F 12/084 711/130 |
| 2014/0047060 A1 * | 2/2014 | Chen | G06F 9/547 709/213 |
| 2014/0047205 A1 * | 2/2014 | Frey | G06F 3/0668 711/163 |
| 2014/0068201 A1 | 3/2014 | Fromm | |
| 2014/0101390 A1 * | 4/2014 | Sohi | G06F 12/0815 711/144 |
| 2014/0181823 A1 | 6/2014 | Manula et al. | |
| 2015/0052313 A1 * | 2/2015 | Ghai | G06F 9/467 711/136 |
| 2015/0052315 A1 * | 2/2015 | Ghai | G06F 9/467 711/145 |
| 2015/0095600 A1 * | 4/2015 | Bahnsen | G06F 9/466 711/163 |
| 2015/0100749 A1 | 4/2015 | Koker et al. | |
| 2015/0253997 A1 * | 9/2015 | Kessler | G06F 3/0608 711/170 |
| 2015/0254104 A1 * | 9/2015 | Kessler | G06F 9/4881 711/170 |
| 2015/0254182 A1 * | 9/2015 | Asher | G06F 12/0815 711/135 |
| 2015/0254183 A1 * | 9/2015 | Akkawi | G06F 12/0833 711/135 |
| 2015/0254207 A1 * | 9/2015 | Kessler | G06F 13/423 710/39 |
| 2016/0043965 A1 | 2/2016 | Raikin et al. | |

OTHER PUBLICATIONS

InfiniBand Architecture Specification, vol. 1, Release 1.2.1, 1727 pages, 2007.
Supplement to InfiniBand Architecture Specification vol. 1.2.1, Annex A14: "Extended Reliable Connected (XRC) Transport Service", Revision 1.0, 43 pages, Mar. 2, 2009.
Raman, A, "Transactional Memory-Implementation", Lecture 1, Princeton University, 63 pages, Fall 2010.
PCI Express® Base Specification, Revision 3.1 , 1073 pages, Mar. 2014.
Mellanox Technologies, Inc. "Mellanox IB-Verbs API (VAPI)", Mellanox Software Programmer's Interface for InfiniBand Verbs, 78 pages, year 2001.
European Application # 171597461 Search Report dated Jul. 25, 2017.

* cited by examiner

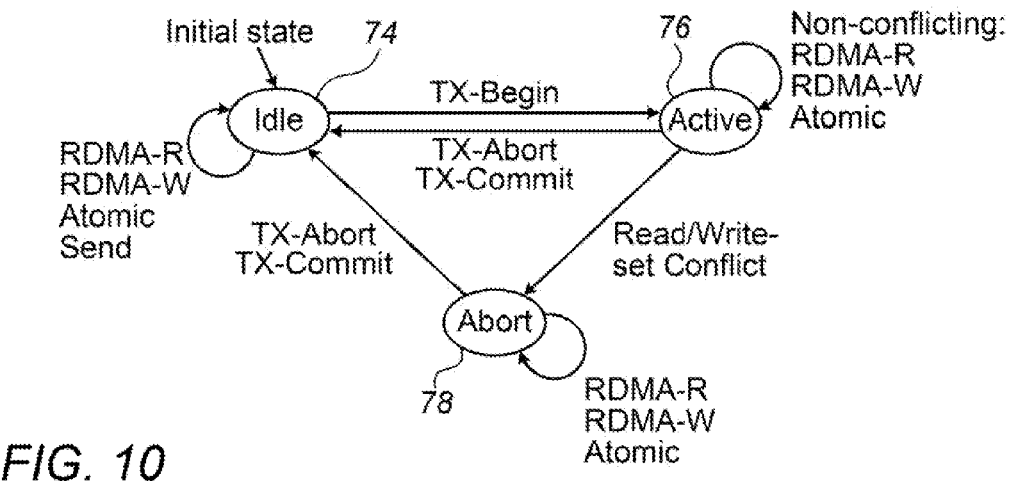
FIG. 10
FIG. 11
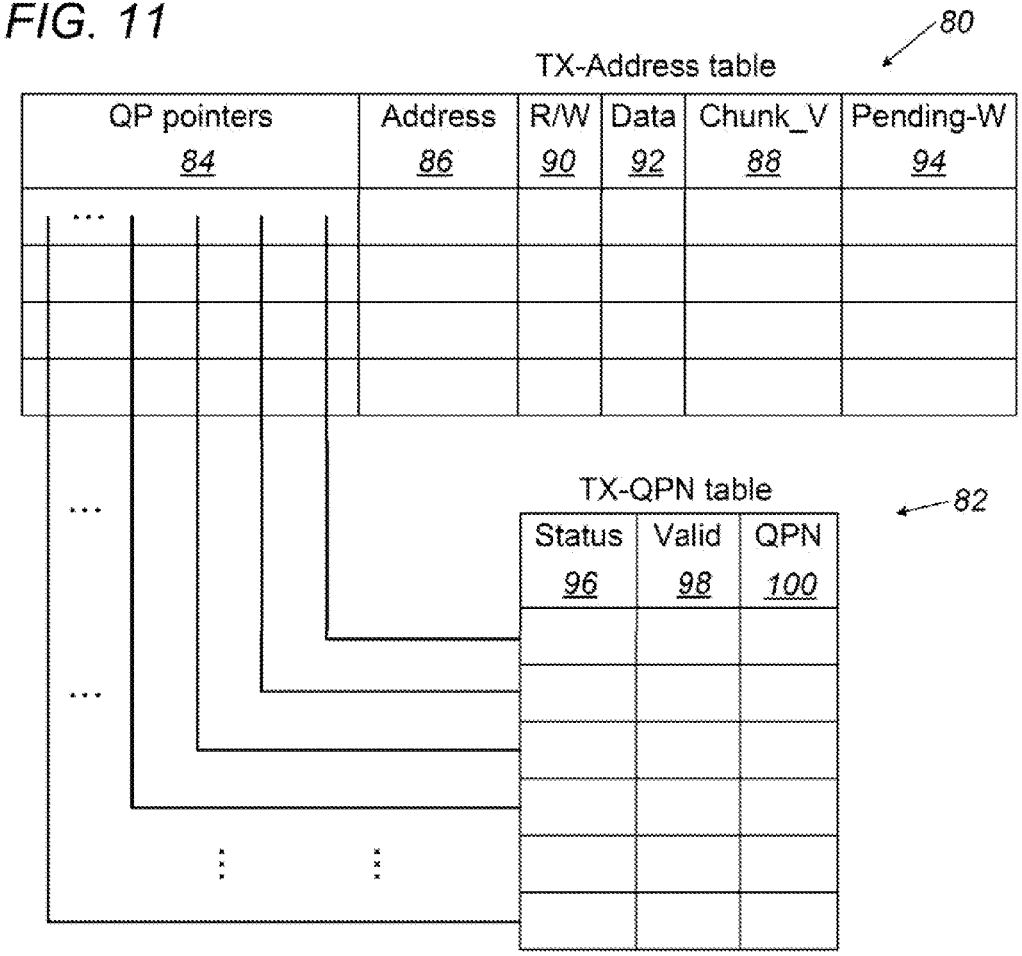

REMOTE TRANSACTIONAL MEMORY

CROSS-REFERENCE TO RELATED APPLICATIONS

This application claims the benefit of U.S. Provisional Application No. 61/969,350, which is herein incorporated by reference.

BACKGROUND OF THE INVENTION

1. Field of the Invention

This invention relates to computer networks. More particularly, this invention relates to inter-process communication over computer networks.

2. Description of the Related Art

The meanings of certain acronyms and abbreviations used herein are given in Table 1.

TABLE 1

Acronyms and Abbreviations

| | |
|---|---|
| CPU | Central Processing Unit |
| HCA | Host Channel Adapter |
| IB | InfiniBand ™ |
| ID | Identifier |
| IO; I/O | Input and Output |
| NIC | Network Interface Controller |
| PSN | Packet Sequence Number |
| QP | Queue Pair |
| RC | Reliable Connection |
| RD | Reliable Datagram |
| RDC | Reliable Datagram Channel |
| RDD | Reliable Datagram Domains |
| RDMA | Remote Direct Memory Access |
| RTM | Remote Transactional Memory |
| TCA | Target Channel Adapter |
| TLP | Transaction Layer Packet |
| TX-QPN | Transaction QP Table |
| UC | Unreliable Connection |
| UD | Unreliable Datagram |
| WQE | Work Queue Element |
| WR | Work Request |
| XRC | Extended Reliable Connected Transport Service |

InfiniBand™ (IB) is a switched-fabric communications architecture primarily used in high-performance computing. It has been standardized by the InfiniBand Trade Association. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA). IB defines both a layered hardware protocol (physical, link, network, and transport layers) and a software layer, which manages initialization and communication between devices. The transport layer is responsible for in-order packet delivery, partitioning, channel multiplexing and transport services, as well as data segmentation when sending and reassembly when receiving.

InfiniBand specifies the following transport services:

Reliable Connection (RC). RC provides reliable transfer of data between two entities, referred to as a requester and a responder. As a connection-oriented transport, RC requires a dedicated queue pair (QP) comprising requester and responder processes.

Unreliable Connection (UC). UC permits transfer of data between two entities. Unlike RC, UC but does not guarantee message delivery or ordering. Each pair of connected processes requires a dedicated UC QP.

Reliable Datagram (RD). Using RD enables a QP to send and receive messages from one or more QPs using a reliable datagram channel (RDC) between each pair of reliable datagram domains (RDDs). RD provides most of the features of RC, but does not require a dedicated QP for each process.

Unreliable Datagram (UD). With UD, a QP can send and receive messages to and from one or more remote QPs, but the messages may get lost, and there is no guarantee of ordering or reliability. UD is connectionless, allowing a single QP to communicate with any other peer QP. Raw Datagram. A raw datagram is a data link layer service, which provides a QP with the ability to send and receive raw datagram messages that are not interpreted.

A recent enhancement to InfiniBand is the Extended Reliable Connected (XRC) transport service (as described, for instance, in "Supplement to InfiniBand™ Architecture Specification Volume 1.2.1, Annex A14: Extended Reliable Connected (XRC) Transport Service", 2009, Revision 1.0). XRC enables a shared receive queue (SRQ) to be shared among multiple processes running on a given host. As a result, each process can maintain a single send QP to each host rather than to each remote process. A receive QP is established per remote send QP and can be shared among all the processes on the host.

One mode of operation applicable to IB is disclosed in commonly assigned U.S. Pat. No. 8,761,189, which is herein incorporated by reference. The mode includes allocating, in a MC, a single dynamically-connected (DC) initiator context for serving requests from an initiator process running on the initiator host to transmit data to multiple target processes running on one or more target nodes. The NIC transmits a first connect packet directed to a first target process and referencing the DC initiator context so as to open a first dynamic connection with the first target process. The NIC receives over the packet network, in response to the first connect packet, a first acknowledgment packet containing a first session identifier (ID). Following receipt of the first acknowledgment packet, the MC transmits one or more first data packets containing the first session ID over the first dynamic connection from the NIC to the first target process. Dynamic connections with other target processes may subsequently be handled in similar fashion.

Communication and synchronization among processors are conventionally managed by systems such as message-passing and shared memory. Both of these have significant drawbacks. For example, message-passing involves exchange of specific messages among independent nodes. While useful in cases where the underlying hardware configuration is relatively simple, it requires data structures to be organized and integrated with execution units for particular sets of applications. Shared memory implementations often require extensive cache line tracking mechanisms to avoid unacceptable latencies and to assure memory consistency. The hardware to accomplish this becomes complex.

Another form of communication synchronization is the transactional memory (TM) model. This is a concurrency control mechanism working on shared memory. It allows a group of loads and stores to execute in an atomic manner, i.e., although the code in the group may modify individual variables through a series of assignments, another computation can only observe the program state immediately before or immediately after the group executes.

In the transactional memory model a transaction may be represented from a programmer's perspective as follows Listing 1

```
Atomic {
    R0 = read [X]
    Optional General Purpose compute
    Write[Y], R1
}
```

From the user's perspective, the transactional memory model constitutes a major paradigm shift compared to existing locking paradigms to ensure data consistency. With locking, there is an association between a location in memory and set of memory locations that store data. This method is bug-prone and often introduces contention for accessing the shared locks.

TM does not require an association between data and locks. The user directly specifies the accesses that need to occur atomically to guarantee consistency, and the underlying mechanism achieves this atomicity. In addition, in the event that a specific user thread fails to complete an atomic transaction, the referenced memory locations are not locked and may be accessed by other transactions. During the transaction the memory can be associated with respective intermediate states and a final state, such that when one process performs the accesses responsively to remote I/O operations that are initiated by the network interface controller, the states are concealed from other processes until occurrence of the final state.

In other words, the atomicity semantics of a transaction imply that from a memory-ordering point of view, all operations within a transaction happen in '0 time', so intermediate states are concealed, i.e., they are never exposed to other processes, only the final state is exposed. Such a transaction, executing under control of a network interface controller, follows an all-or-nothing paradigm, where either all side effects of the transaction happen together or not at all. In the event that a transaction fails, e.g., because another thread has attempted to access the same memory location, the memory remains in its pre-transaction state.

An example of a transactional memory computing system is proposed in U.S. Patent Application Publication No. 2009/0113443. A computing system processes memory transactions for parallel processing of multiple threads of execution and provides execution of multiple atomic instruction groups (AIGs) on multiple systems to support a single large transaction that requires operations on multiple threads of execution and/or on multiple systems connected by a network. The support provides a transaction table in memory and fast detection of potential conflicts between multiple transactions. Special instructions may mark the boundaries of a transaction and identify memory locations applicable to a transaction. A 'private to transaction' tag, directly addressable as part of the main data storage memory location, enables a quick detection of potential conflicts with other transactions that are concurrently executing on another thread. The tag indicates whether (or not) a data entry in memory is part of a speculative memory state of an uncommitted transaction that is currently active in the system.

SUMMARY OF THE INVENTION

Embodiments of the present invention provide a way to perform transactions on remote memory over a network according to the above-noted transactional memory model. This capability may be further extended to distributed transactions performed on multiple remote memories.

There is provided according to embodiments of the invention a method of communication over a data network, which is carried out by performing a transaction across a data network between an initiator host and a remote target. The initiator host has an initiator network interface controller, and the remote target has a target network interface controller and a memory location that is accessible by a first process and a second process. The transaction comprises a plurality of input-output (IO) operations between the initiator network interface controller and the target network interface controller, respectively. The IO operations are controlled by the initiator network interface controller and the target network interface controller to cause the first process to perform accesses to the memory location atomically with respect to the second process.

In an aspect of the method the IO operations include at least one of a first message to begin the transaction, a second message to commit the transaction and a third message that communicates a status of the transaction includes responding to the messages with the target network interface controller.

According to an additional aspect of the method responding to the first message includes causes a state transition of the transaction from an idle state to an active state.

According to another aspect of the method, responding to the second message includes causes a state transition of the transaction from an active state to a committed state.

According to a further aspect of the method, responding to the messages comprises associating a set of read and write operations in the memory location with the transaction in the target network interface controller.

According to one aspect of the method, responding to the messages includes generating a status message with the target network interface controller to report the status of the transaction to the initiator network interface controller.

According to yet another aspect of the method contents of the memory location are available to the first process and concealed from the second process until an occurrence of a final state of the transaction.

Yet another aspect of the method includes identifying accesses to the memory location that conflict with the transaction with the target network interface controller.

Still another aspect of the method includes responsively to identifying accesses transmitting a message to the initiator network interface controller with the target network interface controller to cause the transaction to abort, and discarding results of store operations to the memory location that occurred during the transaction.

According to another aspect of the method, the IO operations are executed concurrently for a plurality of transactions.

According to an additional aspect of the method, the remote target is distributed as a plurality of remote targets and the IO operations occur between the initiator network interface controller and selected ones of the remote targets.

A further aspect of the method includes transmitting command messages from the initiator network interface controller to the target network interface controller, wherein the accesses to the memory location are direct memory accesses that occur responsively to remote direct memory access requests in the command messages.

There is further provided according to embodiments of the invention a network communication apparatus, including an initiator host interface, which is coupled to receive from an initiator host a request from an initiator process running on the initiator host to perform a transaction with a remote target via a data network, The remote target has a target network interface controller and a memory location that is accessible by a first process and a second process. A host network interface controller is coupled to the initiator host and the data network. The transaction comprises a plurality of input-output (IO) operations between the host network interface controller and the target network interface controller. The host network interface controller is configured for controlling the IO operations by issuing commands to the target network interface controller to cause the first process to perform accesses to the memory location atomically with respect to the second process.

There is further provided according to embodiments of the invention a network communication system, including a remote target having a memory location that is accessible by a first process and a second process, a target network interface controller coupled to a data network, an initiator host, and a host network interface controller coupled to the initiator host and the data network, which is configured to receive from the initiator host a request from an initiator process running on the initiator host to perform a transaction with the remote target via the data network. The transaction comprises a plurality of input-output (IO) operations between the host network interface controller and the target network interface controller, wherein accesses to the memory location occur responsively to the IO operations, the host network interface controller and the target network interface controller is configured for conducting the IO operations to cause the first process to perform the accesses to the memory location atomically with respect to the second process.

In one aspect of the system, a processor in the remote target and the target network interface controller are connected by a coherent bus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 10 is a state diagram describing a transaction in accordance with an embodiment of the invention; and FIG. 11 shows tables for maintenance of read and write sets in accordance with an embodiment of the invention.

DETAILED DESCRIPTION OF THE INVENTION

Figure 1:
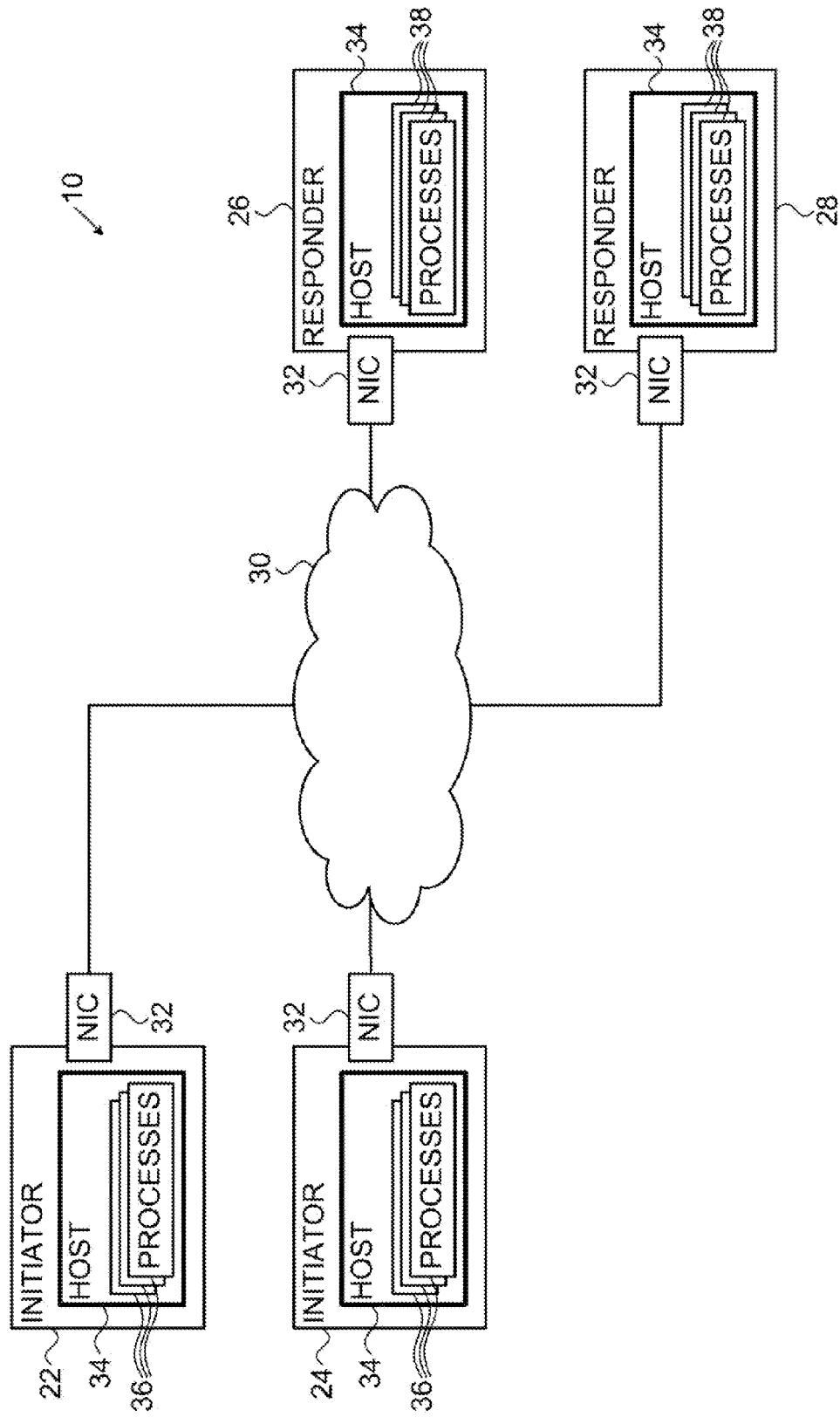
FIG. 1 is a block diagram that schematically illustrates a computer system, in accordance with an embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Definitions.

A "network" is a collection of interconnected hosts, computers, peripherals, terminals, and databases.

A "transaction" consists of memory accesses and other computing operations (referred to herein as "general purpose compute" or simply "compute"), which may be dependent on the memory accesses.

A "local host" is a device that initiates a transaction with another device.

The term "remote host" refers to a target of a transaction that communicates with a local host via a network, e.g., Ethernet, InfiniBand, and similar networks via any number of network nodes.

The term "remote transaction" refers to a transaction between a local host and a remote host that is initiated and conducted by a local host, and in which memory accesses occur on a memory of the remote host as a result of IO operations between the local host and the remote host over a network.

Overview.

A dynamically-connected (DC) transport service, as described in commonly assigned U.S. Patent Application Publication 2011/0116512, which is herein incorporated by reference is discussed for convenience as an exemplary protocol to which the principles of the invention can be applied. There are many reliable protocols which can also be employed, mutatis mutandis, in order to achieve the benefits of the invention allows a DC QP to reliably communicate with multiple responder processes in multiple remote nodes. It is thus useful particularly in reducing the number of required QPs per end-node while preserving RC semantics. Using the DC transport service, an initiator NIC, coupled to an initiator host, can allocate a single DC initiator context to serve multiple requests from an initiator process running on the initiator host to transmit data over a packet network to multiple target processes running on one or more target nodes. Each work request (WR) submitted to a DC send queue includes information identifying the target process on a specified node. In response to these work requests, DC initiator and responder contexts are tied to each other across the network to create dynamic (i.e., temporary), RC-equivalent connections between the initiator and different targets. These connections are used successively to reliably deliver one or more messages to each of the targets. When the initiator (i.e., the NIC of the sending end-node) reaches a point in its send queue at which either there are no further work queue elements (WQEs) to execute, or the next WQE is destined to another target process (possibly in a different node), the current dynamic connection is torn down. The same DC context is then used by the NIC to establish a new dynamic convection to the next target process.

System Description.

Turning now to the drawings, reference is initially made to FIG. 1, which is a block diagram that schematically illustrates a computer system 10, which is an example of a system that supports a reliable transport service in accordance with an embodiment of the present invention. System 10 comprises nodes 22, 24, 26, 28, which are interconnected by a packet network 30, such as an IB switch fabric. In the pictured embodiment, nodes 22 and 24 are initiator nodes, while nodes 26 and 28 are responder nodes, but typically any given node may be both an initiator and a responder concurrently. In this example, there is an initiator process from a group of processes 36 executing on a host 34. Node 22 or node 24, functioning as the initiator, submits a work request to a NIC 32 (such as an IB HCA) to send a message to a target process from among a group of processes 38 executing on the host 34 of a target (responder) node 26, 28. Upon receiving the work request, NIC 32 of the initiator node attempts to establish a connection with the NIC of the responder node by sending a packet. Any reliable protocol is suitable for the connection.

Figure 2:
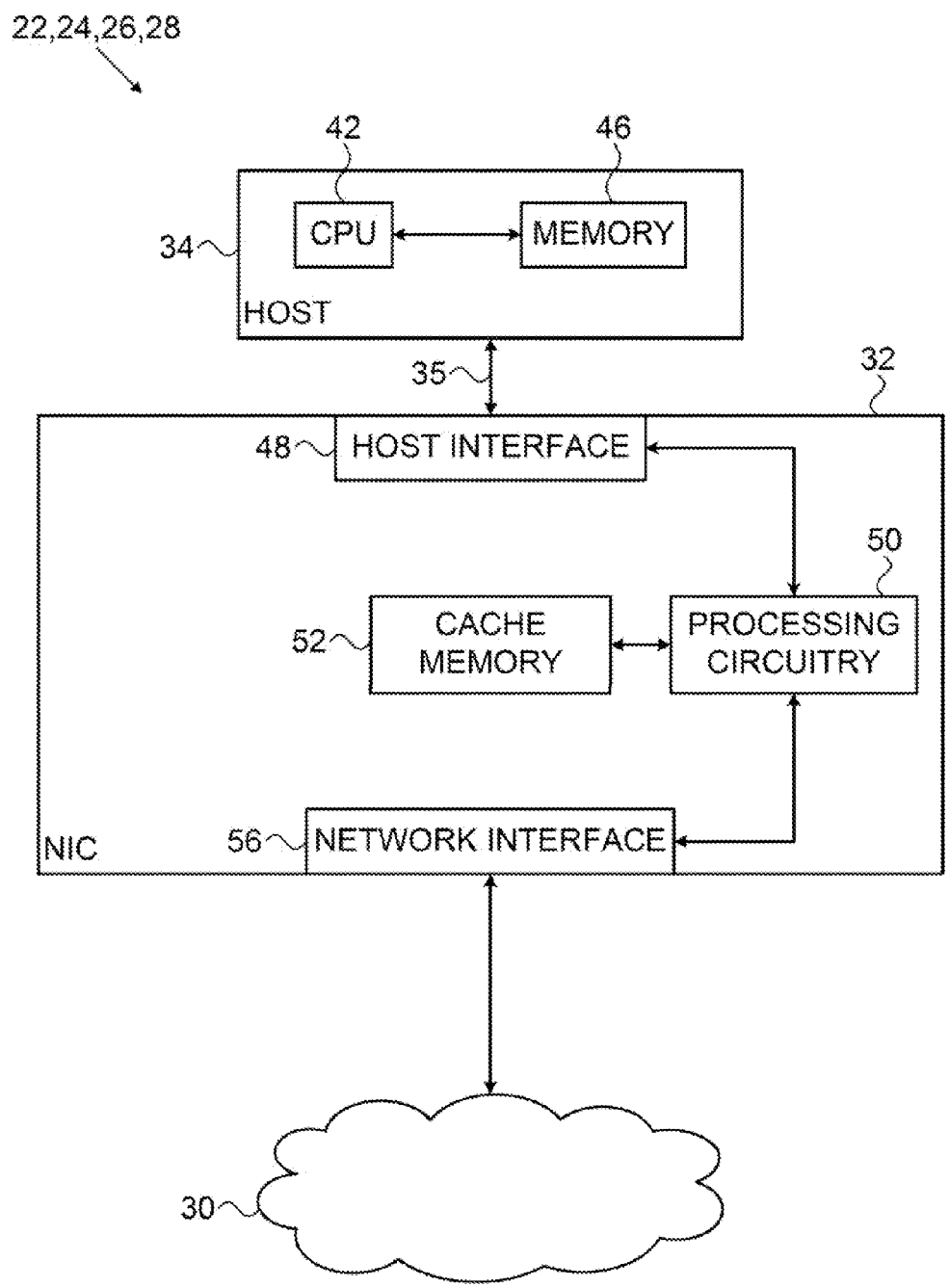
FIG. 2 is a block diagram that schematically shows details of a computing node, in accordance with an embodiment of the invention.

Reference is now made to FIG. 2, which is a block diagram of a computing node, in accordance with an embodiment of the invention that schematically illustrates functional components of nodes 22, 24, 26, 28, and particularly the elements of NIC 32 that are involved in providing transport service, in accordance with an embodiment of the invention. Host 34 comprises a central processing unit (CPU) 42, which runs processes 36, 38 (FIG. 1) and a host memory 46. This memory is typically used to hold both process and system data and context information used by NIC 32. NIC 32 comprises a host interface 48 for communicating with host 34 via a bus 35 and a network interface 56 for transmitting and receiving packets to and from network 30. The functions described below are carried out by processing circuitry 50 cooperative with a suitable memory cache 52.

Remote Transactions.

Figure 3:
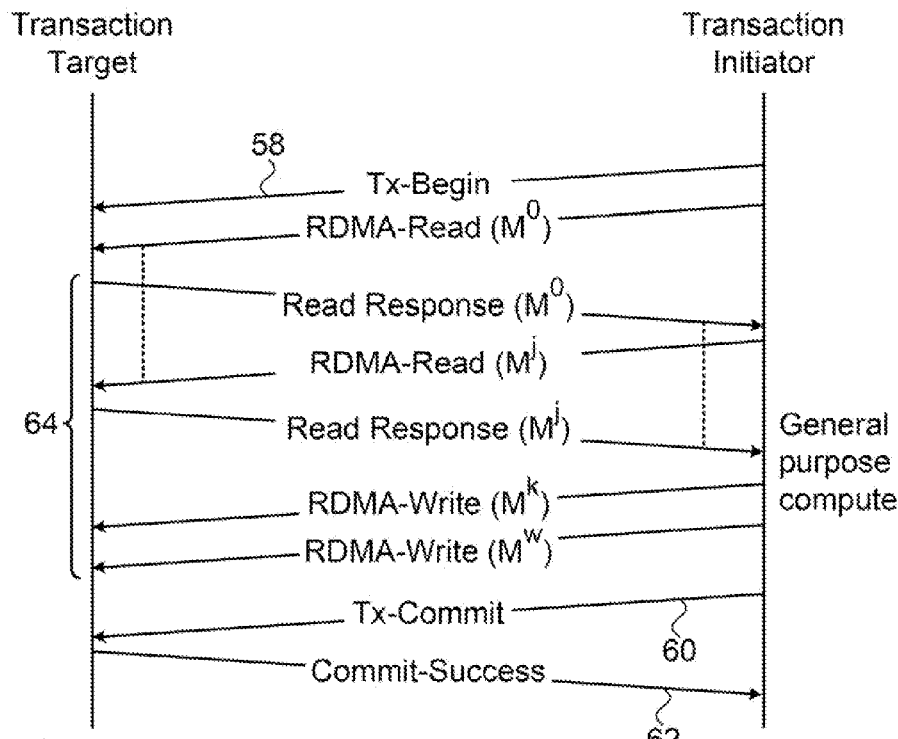
FIG. 3 is a ladder diagram exemplifying a remote transaction, which can be accomplished in accordance with an embodiment of the invention.

Reference is now made to FIG. 3, which is a ladder diagram exemplifying a remote transaction in accordance with an embodiment of the invention. The transaction is accomplished by an IO device that is capable of performing remote transactions, e.g., the NIC 32 shown in FIG. 1 and FIG. 2. Remote transactions of the type shown in FIG. 3 are conducted as part of an explicit IO initiation. The transaction applies to a sequence of IO operations carried over a transport protocol instance, referred to as a flow that occurs between the NIC of a transaction initiator and the NIC of the transaction target. Read and write operations are performed by remote direct memory access. The IO operations include transmission of messages, including TX-begin message 58 to begin the transaction, and a TX-Commit message 60 that commits the transaction. Completion of the transaction is indicated by exchange of a Commit-Success message 62. Other messages that may occur include a TX-ABORT message that cause the transaction to abort, and a TX-QUERY message that requests the current status of the transaction. There may be an exchange of any number of additional messages 64 that can include commands or may comprise status reports regarding the transaction. All NICs that are involved in the transaction support transmitting, receiving, and acting upon the messages.

CPU instructions that initiate the transaction are themselves not part of the transaction, and as such are not rolled back in case of a transaction failure. Memory accesses within a transaction are done on the memory of the IO target, by means of network accesses. Access to memory local to the initiator, using regular memory reads and writes, i.e., reads and writes not involving network accesses, is possible but is not considered a part of the transaction. The compute part can be done by either the IO initiator or the IO target. The actual computation may be performed either by the IO device or the initiator/target CPU.

Figure 4:
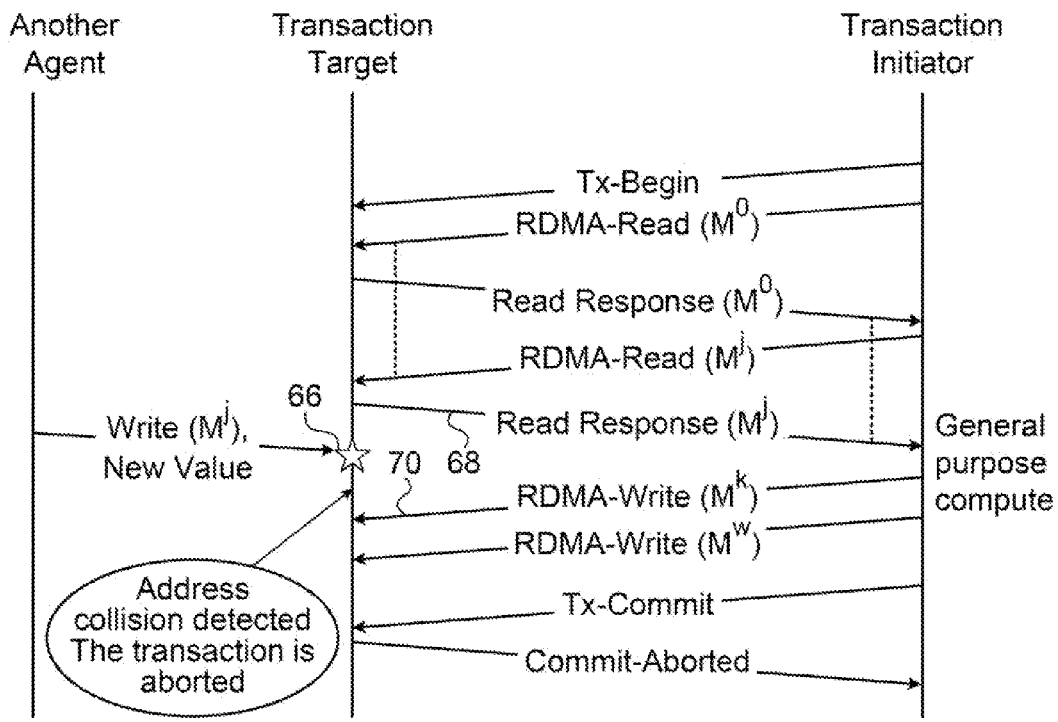
FIG. 4 is a ladder diagram of a remote transaction in accordance with an embodiment of the invention.

Reference is now made to FIG. 4, which is a ladder diagram exemplifying a remote transaction in accordance with an embodiment of the invention. In this example the atomicity of the transaction was violated at point 66 and the transaction must abort. Between events in which a first process executes a read operation from memory $M^j$, (arrow 68), and in the normal course of events would execute a write operation to memory $M^k$ (arrow 70), an address collision occurs when a second process writes to memory $M^j$, thereby violating the atomicity of the transaction being performed by the first process. Consequently the transaction of the first process must be aborted.

Embodiments of the invention provide models for conducting remote transactional memory (RTM) operations with respect to the entity that performs the compute, which can be the following: initiator CPU; initiator IO device; target CPU; and target IO device.

For clarity of exposition, a protocol comprising sets of operations for two exemplary implementations is presented: initiator CPU compute and target IO device compute. The hardware and software of the initiator and target CPUs and IO devices are configured to support the protocol and perform these operations. The following operations are not limited to the examples, and may also apply to other combinations.

Compute operations performed by the initiator CPU provide advantages of general purpose computing, but at the expense of a round trip for each remote memory access. In this model, the transaction comprises IO directives and generic computations. However, only the IO is committed to the transaction. The program execution performed by the initiating CPU is not affected by the outcome of the transaction. Nevertheless, a program executing on the initiator CPU may query the transaction status at any time. Listing 2 provides an example of this approach.

Listing 2

```
Function do_transaction( )
{
    Post_Send(TX-BEGIN);
    Post_Send(RDMA-R / RDMA-W / ATOMIC);
    ..
    Post_Send(RDMA-R / RDMA-W / ATOMIC);
    Post_Send(TX-QUERY);
    if (PollCompletions( ) == failed)
        goto abort;
    err = GeneralComputeLogic( );
    if (err)
        goto abort;
    Post_Send(RDMA-R / RDMA-W / ATOMIC);
    ..
    Post_Send(RDMA-R / RDMA-W / ATOMIC);
    Post_Send(TX-COMMIT);
    return PollCompletions( );
abort:
    Post_send(TX-ABORT);
    return -EAGAIN;
}
```

In the example of Listing 2, IO operations include primitives for initiating, querying, committing, and aborting transactions in addition to conventional read/write operations and polling for completed IO operations. More specifically, the following operations are demonstrated in the context of RTM:

Post_Send(TX-BEGIN)—Indicate the initiation of a transaction on a given transport flow;

Post_Send(TX-COMMIT)—Request to commit all IO operations invoked on the flow since the transaction was initiated;

Post_Send(TX-ABORT)—Abort all IO on the flow since the transaction was initiated;

Post_Send(TX-QUERY)—Query the status of the current transaction;

Post_Send (RDMA-R/RDMA-W/ATOMIC)—Standard remote IO operations;

PollCompletions( )—determine what IO operations have completed and receive their completion status.

The performance of the local compute model may be enhanced by the following additional IO primitives:

COMPARE—compare a given value at the IO target and abort the transaction on failure. This avoids value checks at the initiator;

UNREAD—remove a memory location from the read set. This is useful for reducing contention in transactions that traverse long read-mostly data.

Computation performed by the target IO device avoids round-trips within a transaction at the expense of possible reduced computing power or supported operations. In this model, additional generic compute operations are added to the IO primitives such as variable manipulation, arithmetic operations and control flow. As an alternative for generic compute operations, a reduced set of operations for common tasks may be provided. The following primitives exemplify this approach:

GENERIC_TX(code, parameters)—execute a program with the given parameters remotely;

LIST_FIND(key)—traverse a linked list and return the value that matches the specified key;

LIST_ENQUEUE(key, value)—insert a new value into a linked list;

LIST_DEQUEUE(key)—remove a specific key from a linked list;

BINARY_FIND(key)—traverse a binary tree and return the value that matches the specified key;

BINARY_TREE_ADD(key, value)—Add a value to a binary tree;

BINARY_TREE_DEL(key)—Delete a value from a binary tree;

STACK_PUSH(value)—Push a value into a remote stack;

STACK_POP( )—Pop a value from a remote stack.

Figure 5:
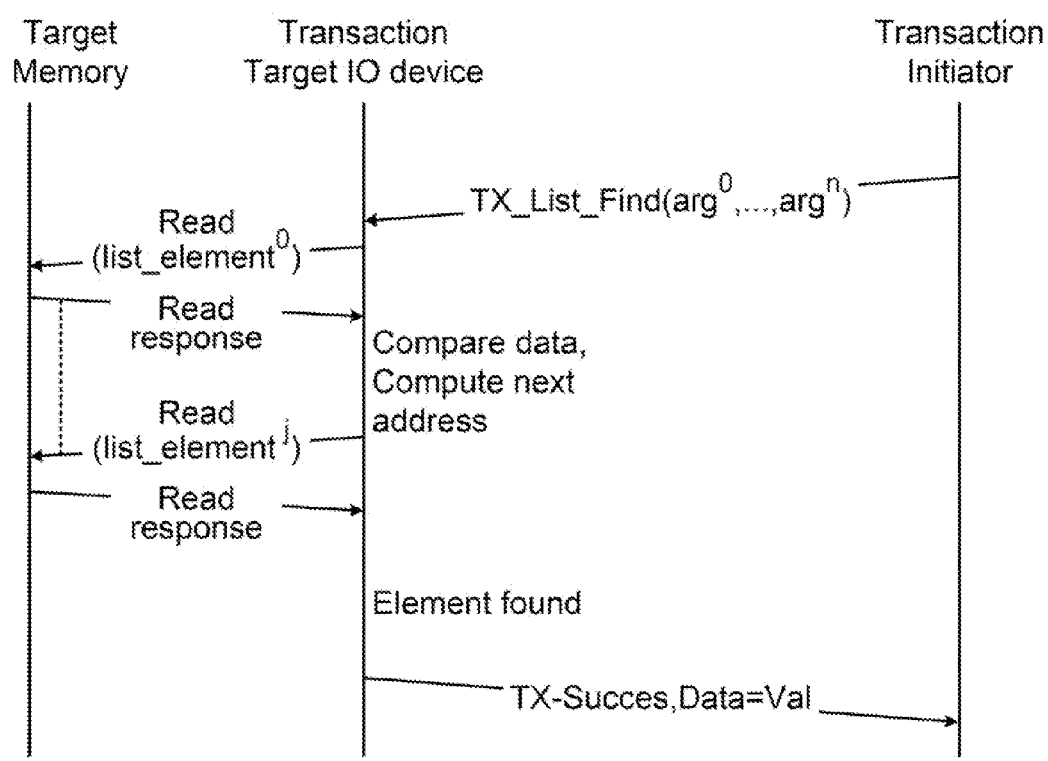
FIG. 5 is a ladder diagram of a remote transaction in accordance with an embodiment of the invention.

Reference is now made to FIG. 5, which is a ladder diagram of a remote transaction in accordance with an embodiment of the invention. FIG. 5 is an example of a transaction where all compute is done by a remote IO device.

Distributed IO Transactions.

Distributed transactions allow a single initiator to atomically commit a transaction that spans multiple transport flows, optionally targeting multiple remote targets. In order to support remote targets that constitute distributed memory a two-phase commit operation should take place:

Phase 1: the initiator of the transaction sends a "Ready to Commit" message to all targets on their respective flows. Upon receiving such a message, all target IO devices will respond with Ready or Abort. This is similar to the commit phase in non-distributed transactions except that the data is not yet committed.

Phase 2: if all target IO devices respond with Ready, a Commit message may be sent to all targets to perform the actual commit operation. Note that in the time frame between replying "Ready" and the actual commit, the initiator should not abort the transaction as it applies to other targets. If the target intends to abort the transaction, it should be done before sending "Ready". Moreover, a remote IO device (other than the initiator) may not abort the transaction.

To support distributed targets, the following commands are added:

TX_PREPARE—sent by initiator to prepare for a commit.

TX_READY—sent by target if the transaction may be committed.

Since transaction targets may not abort a transaction that is ready to commit, any other conflicting accesses to memory (standard or transactional) must either be delayed or failed.

Figure 6:
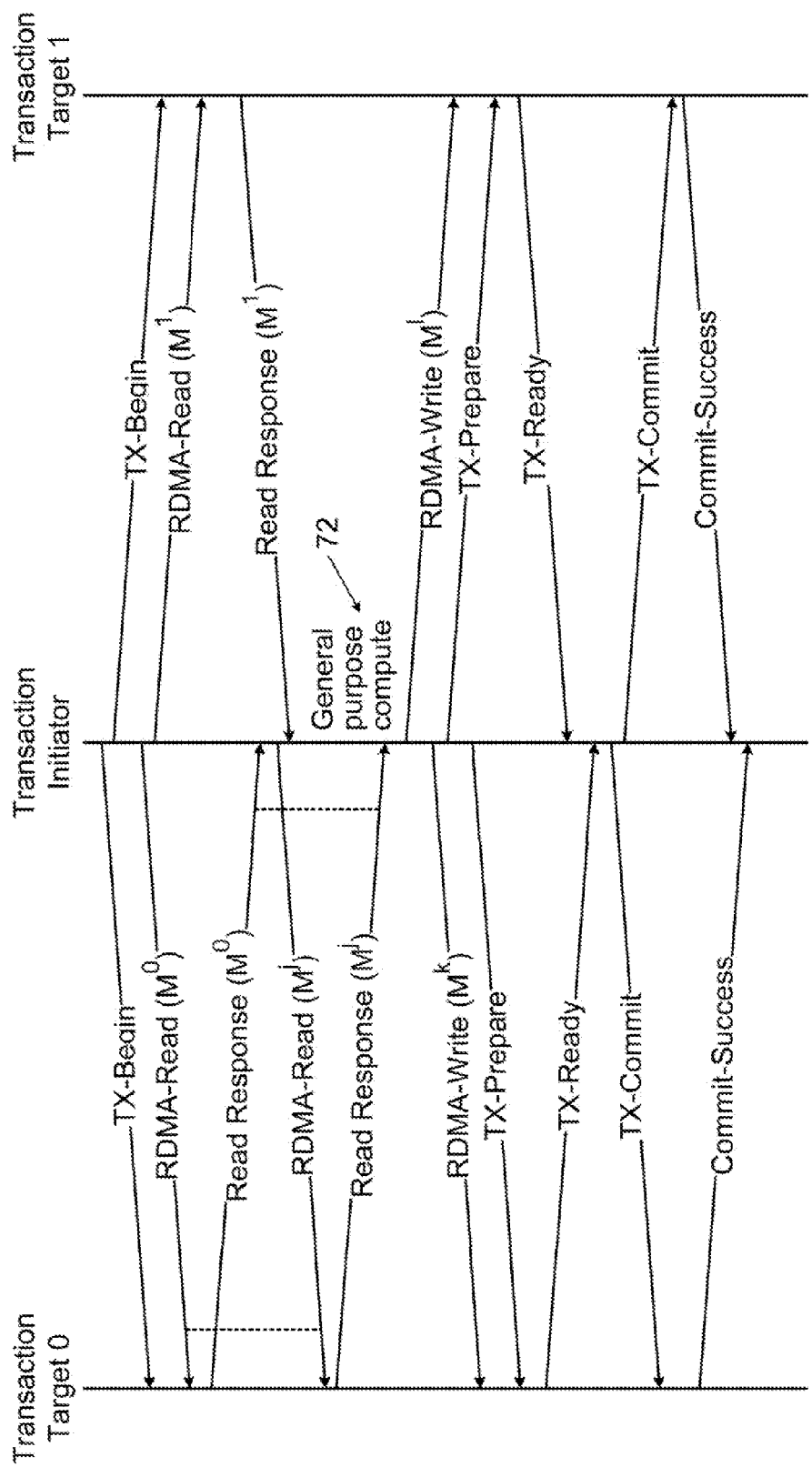
FIG. 6 is a ladder diagram illustrating a distributed transaction in accordance with an embodiment of the invention.

Reference is now made to FIG. 6, which is a ladder diagram illustrating a distributed transaction in accordance with an embodiment of the invention. For clarity of presentation, the illustrated transaction has two remote targets (Target 0; Target 1). However the principles may be applied to any number of remote targets. The compute operations, e.g., general purpose compute operation 72 performed need not be identical in different targets. Moreover the sequence of I/O operations may differ among the remote targets.

Transaction-Transport Interaction.

The transaction layer, i.e., the interaction between the transport service and the transaction running on top of it, assumes that all operations are observable once and in-order at the target. Protocols such as RDMA over Converged Ethernet (RoCE) and Internet Wide Area RDMA Protocol (iWARP) are suitable as the transport service. Other protocols may be used. In any case, transactions should generally be performed over reliable network transport types. All transport-level operations to ensure reliability such as retransmissions are not visible and do not affect the operation of the transaction layer.

Transaction status and response are reported using specific transport operations. These operations are independent of the transport fields that are used to provide reliability, such as ACK/NACK fields.

Transaction status is reported in response to a COMMIT operation. In addition, it may be explicitly queried by a TX-QUERY operation, or returned as part of the response of standard IO operations. In particular, indicating the status in READ completions allows the initiator to avoid acting upon stale data due to aborted transactions, without incurring the round-trip latency of an additional TX-QUERY operation.

Transactions are sequentially ordered within a connection. A transaction starts by an indication of its beginning, e.g., a TX-BEGIN operation, and ends either with a request to commit or abort the transaction, i.e., TX-COMMIT or TX-ABORT operations, respectively. Any IO operation conducted between the beginning and end of a transaction is considered as part of the transaction.

Explicitly indicating the end of a transaction allows for pipelining transactions within the same flow without first waiting for responses from the target for each transaction. It is also beneficial for pipelining non-transactional IO operations that may follow transactions.

A unique transaction identifier is not needed as each transaction is identified by its flow and the transport sequence number within the flow. For example, in Infini-Band, a transaction may be identified by its connecting QPs and their network addresses, accompanied by a packet sequence number (PSN) of the TX-BEGIN operation.

In the event of packet loss, transport retries should not violate transaction semantics. Special care must be taken in READ and COMMIT retransmissions as detailed below. In case of a retry due to a packet that is lost in the network, the network behavior should remain consistent. For example, if a response to a TX-Commit operation is lost, the replayed response should convey the same message. This requirement is similar to the requirements of network-based atomic operations.

It is possible that a transactional READ operation returns a response, but that the response will be dropped by the network. In that case, the READ operation needs to be reissued. If the READ operation is retried before the transaction is committed, its exact original value as saved by a read-set (an implementation described below) should be returned.

If a transaction has aborted, either because of a TX-ABORT operation or due to a conflict at the target, retried READ operations may return undefined results. However, these responses convey an explicit indication of this fact, so that the transaction initiator will be aware that the returned data is stale.

Figure 7:
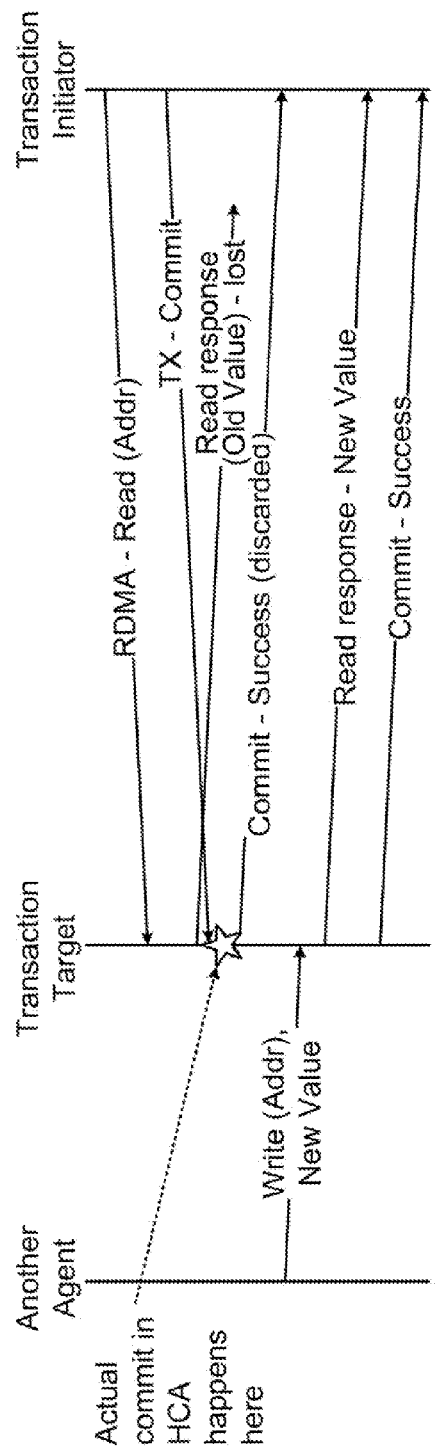
FIG. 7 is a ladder diagram that illustrates a transactional situation that is processed in accordance with an embodiment of the invention.

If a TX-COMMIT operation was sent by the initiator and executed by the responder, it is possible that a subsequent retried READ operation will return data that was not part of the transaction. Reference is now made to FIG. 7, which is a ladder diagram that illustrates this situation.

Figure 8:
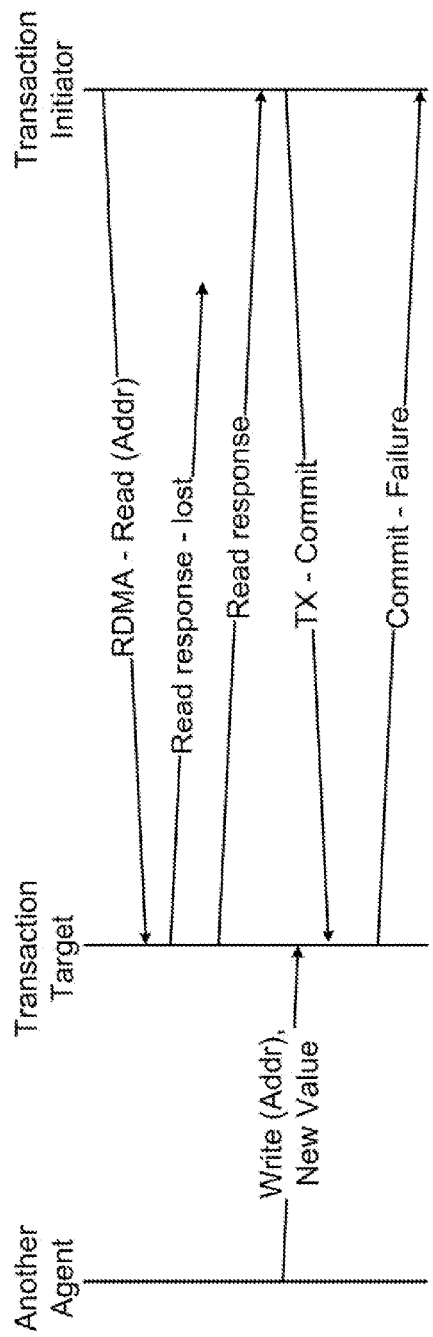
FIG. 8 is a ladder diagram that illustrates a solution for the situation shown in FIG. 7 in accordance with an embodiment of the invention.

If the correctness of a program depends on the data returned by the READ operation, it should consume the data before issuing the TX-Commit command. Reference is now made to FIG. 8, which is a ladder diagram that illustrates a solution for the difficulty shown in FIG. 7, in accordance with an embodiment of the invention.

In the event that responses to TX_COMMIT operations were lost, any retried COMMIT operations should return exactly the same status as the original response from the target. In order to bound the size of the state that the target must hold to support such retransmissions, the number of in-flight unacknowledged transactions that may be initiated can be limited and negotiated before establishing the connection. This mechanism is similar to limits on the number of outstanding atomic operations in InfiniBand fabrics.

Figure 9:
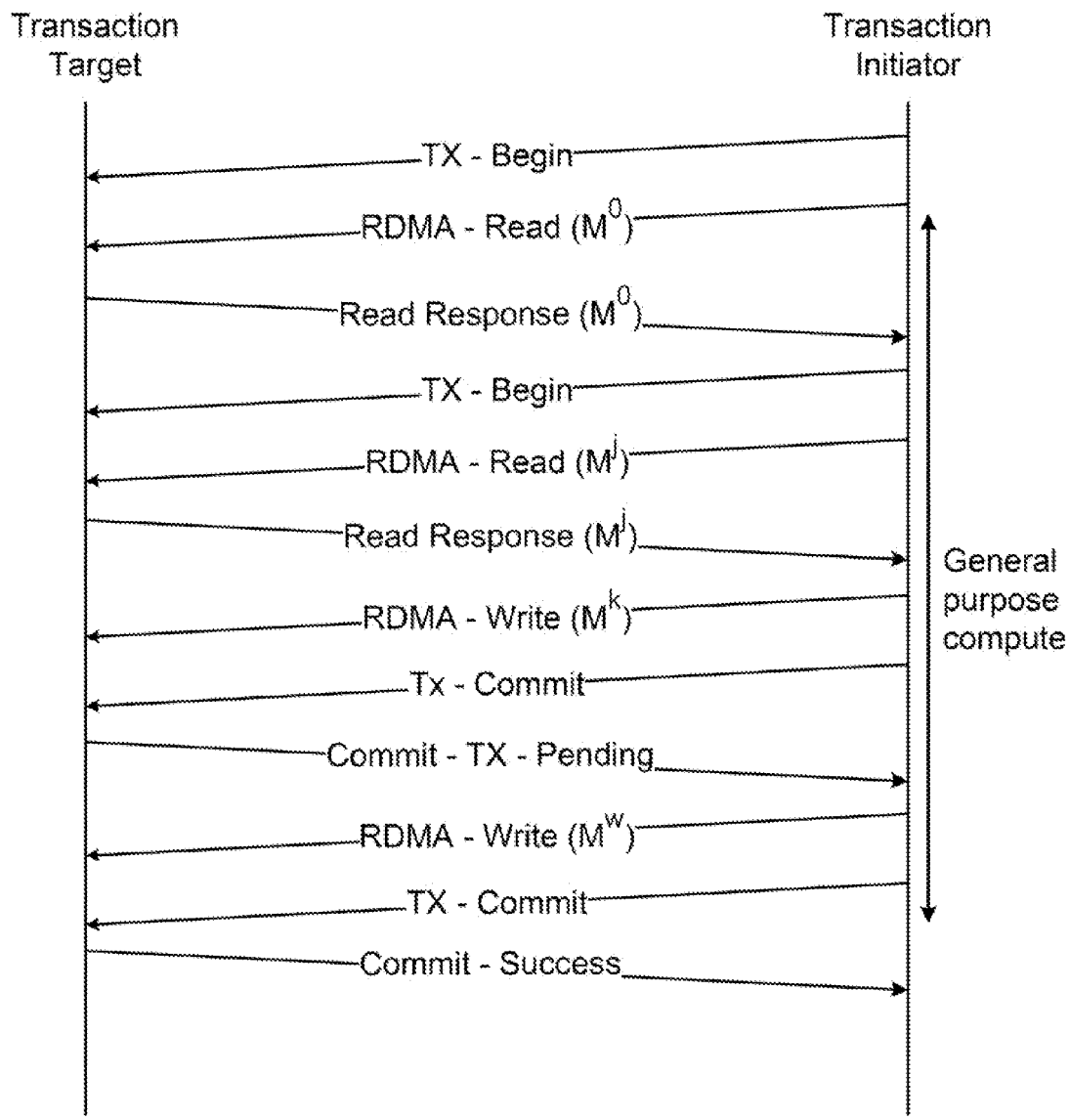
FIG. 9 is a ladder diagram illustrating nested transactions in accordance with an embodiment of the invention.

Reference is now made to FIG. 9, which is a ladder diagram illustrating nested transactions in accordance with an embodiment of the invention. An initiator may nest multiple outstanding transactions on the same flow, as long as nested transactions completely overlap). Nested transactions are flattened, such that the entire group of nested transactions commits as a group when the outermost transaction commits. Internal TX_COMMIT operations, i.e., from intermediate nested transactions, return a TX-PENDING status if the nested transaction has not aborted yet.
Implementation.

In one embodiment, the basic underlying mechanism to support transactions comprises read and write sets, which are maintained by the target for each transaction. The read set holds all addresses that were read during a transaction. A write set holds the addresses that were written during a transaction. Atomicity is maintained by comparing any memory access external to the transaction with accesses that happened during the transaction (and are logged in the read and write sets). In case of a collision (read vs. write or write vs. write) between transactions, one of the conflicting transactions will abort.

Reference is now made to FIG. 10, which is a state diagram describing a transaction, in accordance with an embodiment of the invention. It will be recalled that a transaction starts and ends with an explicit message from the initiator to the responder. If the responder aborts the transaction during this time, the transaction persists in an aborted state until TX-ABORT or TX-COMMIT operations are received. The diagram shows transitions between an idle state 74 (TX-IDLE), an active state 76 (TX-ACTIVE) and an abort state 78 (TX-ABORT).

The transaction target NIC, which acts on messages received from the transaction initiator NIC is capable of moving from the idle state 74 to the active state 76, i.e., processing the transaction when the idle state 74 changes to the active state 76. Moreover, while in the active state 76 the target NIC has processing capabilities that enable it to mark a group of read and write requests in order to associate the requests with a particular transaction. The target NIC must identify access requests that conflict with active transactions, and must commit changes to memory in an atomic manner with respect to other network agents and with respect to the CPU attached to the target NIC.

In the event that the transaction enters the abort state 78, the target NIC recognizes the change in state and discards all stores that are part of the transaction.
Tracking the Transaction State.

In InfiniBand, a reliable communication flow is represented by two connected queue pairs in network entities—i.e., nodes or devices. Numerous flows may be active within an InfiniBand host channel adapter. In order to track read and write sets of the flows having active transactions efficiently, an additional transaction QP table (TX-QPN) is introduced. Reference is now made to FIG. 11, which is a diagram illustrating the maintenance of read and write sets in accordance with an embodiment of the invention. The sets are maintained in two tables: a transaction resource table, TX-Address table 80 and a table holding information on queue pairs, TX-QPN table 82.

Each row in the TX-Address table 80 represents a chunk of data having a fixed size at a given address, and comprises the following fields:

Pointers to entries of the TX-QPN table 82 (column 84).
Address—the address of this chunk (column 86).
Chunk_v bits (column 88) holds valid bits for a given granularity, for example four bytes. In this example a transaction which is not four-byte-aligned will cause a full chunk read on the memory bus and the returned data will be merged.
Read/Write indicator—indicates whether this chunk was read or written by currently active transactions (column 90).
Data—for written chunks, the value to be committed (column 92).
Pending-write indicator—indicates whether this chunk was committed and is currently being flushed to memory (column 94).

The chunk size determines the access tracking granularity. Chunk sizes may be as small as a primitive data type (such as a 64 bit integer), a cache line, or larger. The chunk address may refer to a physical host address, or to an IO virtual address. For example, in InfiniBand, the address may be relative to a specific memory region.

Referring to the state diagram of FIG. 10, transaction status column 96 in the TX-QPN table 82 indicates whether a QP currently has a transaction in active state 76 or in idle state 74. Transition to active state 76 is done upon processing a TX-BEGIN operation. Transition to idle state 74 occurs on reception of either a TX-ABORT or TX-COMMIT operation. In case of an unexpected operation (for example, a transition from abort state 78 to idle state 74 occurs on reception of a TX-COMMIT or TX-ABORT operation when the QP state is TX-IDLE), the QP will be closed and error will be reported.

For supporting nested transactions, the QP may alternatively or additionally hold a "nesting-count" field. This field is incremented whenever a TX-BEGIN operation is received and decremented upon receiving TX-ABORT or TX-COMMIT. The transaction status column 96 holds the value TX-ACTIVE if a nesting count is positive, The nesting count may be included in entries of the transaction status column, and indicates the current number of pending nested transactions). Otherwise the transaction status column 96 holds the value TX-IDLE. For example the status "aborted" could be encoded as −1.

The TX-QPN table 82 holds an "abort-status" field in transaction status column 96, which holds more information regarding aborted transactions. For example, row entries of the transaction status column 96 may specify the reason for an aborted transaction if applicable This information is later communicated to the requestor in the COMMIT operation response or as a response to a TX-QUERY operation.

As noted above, the TX-QPN table 82 holds QPs with active transactions. In addition to the entries of the transaction status column 96 described above, the TX-QPN table 82 has a QPN column 98 and a valid column 100, whose row entries contain the QP number of a transaction, respectively.

A "valid indication" in a row of the valid column 100 in the TX-QPN table 82 indicates that a transaction is valid. If no valid row exists for a given QP, then this QP does not have an active transaction.

A TX-BEGIN operation allocates an entry in the TX-QPN table 82. In case no empty slot is found, an older transaction may be aborted and its place in the table will be cleared for the new transaction. Thus, the size of the TX-QPN table 82 dictates a maximum number of concurrent transactions.

In case of a transaction abort, the relevant hardware element may be queried, e.g., by software running on a CPU, to extract the reason for the abort. Such reasons can include:
Lack of transaction resources:
  The read and write sets exceed the capacity of the TX-Address table 80.
  The transaction may succeed if retried as the TX-Address table 80 is shared by multiple streams.
Conflict Abort:
  Abort due to a conflicting access by a different initiator. The transaction may succeed if retried.
Timeout:
  The transaction's timeout has been exceeded.
Permanent failure:
  The transaction will never succeed if retried due to an unspecified reason.
Collision Detection.

Continuing to refer to FIG. 11, in order to detect collisions between a transaction and either another transaction or a non-transactional operation, the addresses of all incoming accesses from flows different from the flow owning the transaction are compared against addresses currently residing in the TX-Address table 80. Read sharing is allowed. A read/write or write/write conflict will abort one of the transactions, according to a current abort policy.

The following considerations suggest an abort policy that favors aborting a current running transaction:

(1) To guarantee live-ness, it is better (but not strictly required) to abort the transaction as there is no guarantee that the transaction will ever commit.

(2) An access from a different flow might be a non-transactional access, which may not be possible to abort.

(3) In case of distributed memory targets, there is a phase between a "commit-ready" indication and the Commit operation in which aborting is no longer possible.

Intermediate data (including data produced by transactional stores) is written to the TX-Address table 80. If non-transactional modified data already exists in this table (from previous transactions or due to any other reason), they will be written back to memory before writing the intermediate data.

Each incoming read operation will be checked against the content of the TX-table. If the read operation hits a TX store from the same transaction, data will be forwarded. For example, consider the code in Listing 3:

---
Listing 3
---
[X] = 0
Atomic {
Store [X], 5
...
...
Reg0 = Read [X]
}
---

The expected value of register Reg0, assuming the transaction did not abort, is 5 (and not 0). So a read within the transaction should observe data that was written ahead of it within the same transaction. This is physically done by detecting matching addresses in the TX-Address-Table, and forwarding the data from the TX-Address table 80 to the load operation.

In case of partial overlap between such reads and older writes, a read cycle can be sent to system memory, and upon data return, the incoming data are merged with the data existing in the TX-Address table and sent back to the requestor.

Atomic Abort and Commit Operations.

Continuing to refer to FIG. 11, if a transaction fails, all data that were written during the transaction are discarded. As explained above, the TX-Address table 80 holds addresses and data of stores that were performed during the transaction. Aborting can be performed by clearing the transactional state in the IO device—thus moving all entries belonging to the transaction in the TX-QPN table 82 from an active to an aborted state. All entries within the TX-Address table 80 relating to the aborted transaction are discarded.

To ensure that data written during a transaction is exposed to other readers in an "all-or-nothing" manner, all writes within the transaction should be observable by any process that attempts to read locations that were changed by the transaction once the transaction commits. The Target NIC must provide data written by stores during the transaction in response to consecutive loads that are internal to the transaction, but hides these stores from any outside access during the transaction. When the link between the NIC and CPU of a host is coherent, as explained below, atomicity can also be maintained with respect to the CPU. Otherwise, atomicity is only guaranteed for IO operations passing through the NIC.

Since the writes are buffered in an internal structure, they should be drained to memory together without interleaving of any load operation during while the memory is being drain. Alternatively, if one committed store can be observed by incoming loads, all other such stores should be observable, as well.

Furthermore, the atomicity of commit operations is to be maintained even while supporting multiple outstanding transactions concurrently. While the TX-Address table 80 may hold store operations from multiple transactions, the commit operation causes only the stores from the committing transaction to be committed. This objective is achieved by matching the QP number of the committing transaction to QP numbers of stores within the TX-Address table 80.

Specifically, the commit operation performs a lookup in the TX-QPN table 82 to search for its QPN in the TX-Active state. While the transaction remains active for its QP, all writes from the given transaction will become "committed": The TX-QPN number references the commit line of the given QPN entry in the TX-Address table 80, thus causing a pending-write bit to be set for all matching write entries.

A success code is reported in a message from the target network interface controller to the initiator network interface controller.

All writes occurring while the pending-write bit is set will be arbitrated to memory with the highest priority, stalling all other memory accesses. As noted above, the semantics of a transaction mean that stores that are a part of a transaction are observed in an "all or nothing" manner.

An implementation option makes the TX-Address table 80 globally visible to all incoming memory requests and to satisfy reads or merge writes by reference to the table.

In another implementation option only those flows that collide with addresses that are pending but not yet committed are stalled.

Alternative Embodiment

In this embodiment an NIC and a CPU contain caches to buffer data for communication with a shared memory as shown in FIG. 2, in which the bus 35 is a coherent bus, which enables the data held in the two caches to be maintained in a coherent manner with one another and with the shared memory. In this arrangement the NIC can acquire exclusive ownership of all lines of the bus during an atomic transaction. Once the transaction commits, the NIC changes the status of all the lines from an exclusive state to a modified state so as to guarantee atomicity of the transaction. A line is in an exclusive state when the line resides only in the cache of the NIC and is invalid (or not present) in all other caches, and in a modified state when data on the line has been changed by the NIC. In this way, the transaction can be atomic with respect to a local CPU as well as to other hosts on the network.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication over a data network, comprising the steps of:
    performing a transaction across a data network between an initiator host and a remote target, the initiator host having an initiator network interface controller, and the remote target having a central processing unit including a first cache memory, a target network interface controller including a second cache memory, and a shared memory, wherein the shared memory is accessible by a first process and a second process, the transaction comprising a plurality of input-output (IO) operations between the initiator network interface controller and the target network interface controller, respectively;
    linking the first cache memory, the second cache memory and the shared memory by a coherent bus having bus lines;
    acquiring the coherent bus with the target network interface controller during the transaction and changing a status of the bus lines; and
    controlling the IO operations with the initiator network interface controller and the target network interface controller to cause the first process to perform accesses to the shared memory atomically with respect to the second process.

2. The method according to claim 1, wherein the IO operations comprise messages including at least one of a first message to begin the transaction, a second message to commit the transaction and a third message that communicates a status of the transaction, further comprising responding to the messages with the target network interface controller.

3. The method according to claim 2, wherein responding to the first message comprises causes a state transition of the transaction from an idle state to an active state.

4. The method according to claim 2, wherein responding to the second message causes a state transition of the transaction from an active state to a committed state.

5. The method according to claim 2, wherein responding to the messages comprises in the target network interface controller associating a set of read and write operations in the shared memory with the transaction.

6. The method according to claim 5, wherein associating a set of read and write operations comprises:
    establishing a first table containing information on queue pairs of requester and responder processes that are participating in the transaction; and
    establishing a second table containing transaction resource information as chunks of data.

7. The method according to claim 6, wherein a chunk comprises a cache line of the second cache memory and includes a reference to the first table, an address of the chunk, an identifier of valid bytes for the chunk, a read/write indicator of whether the chunk has been read or written by currently active transactions; a value to be committed in the transaction, and a pending-write indicator.

8. The method according to claim 2, wherein responding to the messages comprises generating a status message with the target network interface controller to report the status of the transaction to the initiator network interface controller.

9. The method according to claim 1, wherein contents of the shared memory are available to the first process and concealed from the second process until an occurrence of a final state of the transaction.

10. The method according to claim 1, further comprising identifying accesses to the shared memory with the target network interface controller that conflict with the transaction.

11. The method according to claim 10, further comprising the steps of:
    responsively to identifying accesses transmitting an abort message to the initiator network interface controller with the target network interface controller to cause the transaction to abort; and
    discarding results of store operations to the shared memory that occurred during the transaction.

12. The method according to claim 1, wherein the IO operations are executed concurrently for a plurality of transactions.

13. The method according to claim 1, wherein the remote target comprises a plurality of remote targets and the IO operations occur between the initiator network interface controller and selected ones of the remote targets.

14. The method according to claim 13, wherein compute operations are performed responsively to the IO operations, and the compute operations are performed in the plurality of remote targets.

15. The method according to claim 1, further comprising transmitting command messages from the initiator network interface controller to the target network interface controller, wherein the accesses to the shared memory are direct memory accesses that occur responsively to remote direct memory access requests in the command messages.

16. The method according to claim 1, wherein compute operations are performed responsively to the IO operations, and the compute operations are performed only in the remote target.

17. A network communication apparatus, comprising:
first circuitry comprising an initiator host interface linked to a coherent bus having bus lines, which is coupled to receive from an initiator host a request from an initiator process running on the initiator host to perform a transaction with a remote target via a data network, the remote target having a central processing unit including a first cache memory, a target network interface controller including a second cache memory, and a shared memory that is accessible by a first process and a second process, wherein the first cache memory, the second cache memory and the shared memory are linked to the coherent bus; and
second circuitry comprising a host network interface controller coupled to the initiator host and the data network, the transaction comprising a plurality of input-output (IO) operations between the host network interface controller and the target network interface controller, the host network interface controller being configured for controlling the IO operations by controlling a status of the bus lines and by issuing commands to the target network interface controller to cause the first process to perform accesses to the shared memory atomically with respect to the second process.

18. The apparatus according to claim 17, wherein the IO operations comprise messages including at least one of a first message to begin the transaction, a second message to commit the transaction and at least one third message that communicates a status of the transaction, wherein the host network interface controller is configured for responding to messages from the target network interface controller.

19. The apparatus according to claim 17, wherein contents of the shared memory are available to the first process and concealed from the second process until an occurrence of a final state of the transaction.

20. The apparatus according to claim 17, wherein the host network interface controller is configured for performing the IO operations for a plurality of transactions concurrently.

21. The apparatus according to claim 17, wherein the remote target comprises a plurality of remote targets and the host network interface controller is configured for performing the IO operations with selected ones of the remote targets.

22. A network communication system, comprising:
a remote target having a shared memory location that is accessible by a first process and a second process;
first circuitry comprising a target network interface controller coupled to a data network;
an initiator host having a central processing unit including a first cache memory, and
second circuitry comprising a host network interface controller having a second cache memory, the host network interface controller being coupled to the initiator host and the data network and being, configured to receive from the initiator host a request from an initiator process running on the initiator host to perform a transaction with the remote target via the data network, the transaction comprising a plurality of input-output (IO) operations between the host network interface controller and the target network interface controller, wherein accesses to the shared memory location occur responsively to the IO operations, the host network interface controller and the target network interface controller being configured for conducting the IO operations to cause the first process to perform the accesses to the shared memory location atomically with respect to the second process, wherein the target network interface controller and the central processing unit of the remote target are connected by a coherent bus having bus lines, and wherein the first cache memory, the second cache memory and the shared memory location are linked to the coherent bus, and wherein the target network interface controller is operative to acquire ownership of the bus lines and to change a status thereof.

23. The system according to claim 22, wherein the host network interface controller is configured for performing the IO operations for a plurality of transactions concurrently.

* * * * *